Aug. 17, 1954

C. R. HAIG, JR 2,686,570

HELICOPTER ROTOR CONTROL HUB LINKAGE

Filed Oct. 24, 1952

INVENTOR.
CHESTER R. HAIG, JR.
BY
Beau, Brooks, Buckley & Beau,
ATTORNEYS.

Patented Aug. 17, 1954

2,686,570

UNITED STATES PATENT OFFICE 2,686,570

HELICOPTER ROTOR CONTROL HUB LINKAGE

Chester R. Haig, Jr., Snyder, N. Y.

Application October 24, 1952, Serial No. 316,603

6 Claims. (Cl. 170—160.56)

This invention relates to rotary wing aircraft and particularly to helicopter aircraft rotor mounting and positioning means.

At the present time practical and operable helicopter aircraft rotors fall into two fairly well defined classes. One of these may be defined as of the semi-rigid type wherein a pair of oppositely extending rotor blades have a common central chordwise hinge to accommodate the cyclic vertical flapping movements of the blades which result from cyclic differences in air speed of the blades in horizontal flight or in flight having a horizontal component. Under such flight conditions the advancing blade is subject to greater lift loads than the opposite retreating blade due to the difference in relative air speed and accordingly the advancing blade tends to climb as the retreating blade tends to dip. These opposed tendencies are jointly accommodated by providing the aforesaid common flapping axis which results in cyclic teetering movement of the blades as a unit.

The other of the above two classes of helicopter rotors comprises rotors wherein the blades have independent chordwise hinges for coning and flapping movements. Such rotors are generally further provided with hinges extending parallel to the mast axis for drag adjustment and are thus classified as fully articulated rotors. Since the blades of fully articulated rotors are individually and independently mounted as to coning and flapping hinges and drag hinges they are most commonly used in three-blade rotors, since the joint teetering arrangement of semi-rigid blades require diametrically opposed blades as in two-blade rotors.

Each of the foregoing two classes of rotors has certain inherent and recognized advantages and disadvantages. Further, both classes of rotors, in actual practice, embody many corrective modifications which has been arrived at more or less empirically during years of development and experimentation, such modifications generally comprising compromises and concessions to known theoretical objectives.

The rotor system of the present invention represents a new and independent design which is a marked departure from the known and accepted rotor systems. While not limited strictly thereto, I have herein illustrated the principles of my inventions in connection with a two-blade rotor system since, other things being equal, a two-blade rotor is aerodynamically the most efficient, the lightest, and the most economical to construct.

In the rotor system of my invention the blades are free to flap and cone independently so that only small flap bending moments exist at all times. Further the flapping is constrained to take place in such manner that the rotor is always in geometric balance, that is, so that the center of gravity of the rotor as a whole always remains on the center of rotation regardless of the flapping pattern. This constraint is preferably imposed positively but in such manner that no large chordwise or flapping bending moments are introduced.

A typical embodiment of the principles of the present invention is illustrated in the accompanying drawing and described in detail in the following specification. It is to be understood, however, that such embodiment is by way of example only and that the principles of the present invention are limited only as defined in the appended claims.

Figure 1:
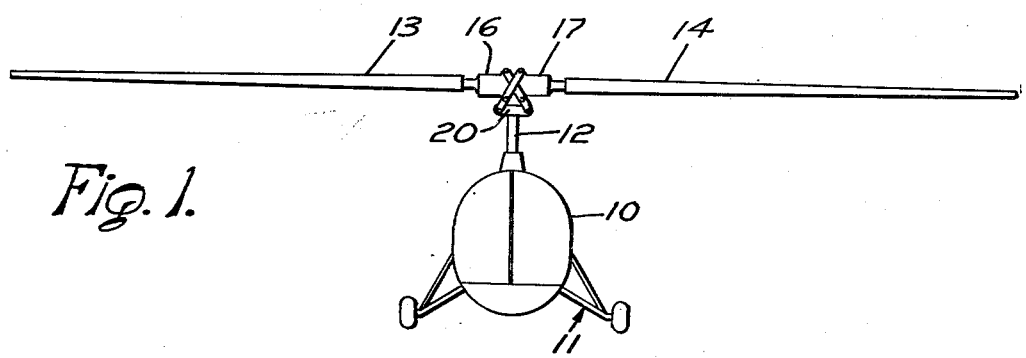
Fig. 1 is a front view of a helicopter aircraft including a two-blade rotor provided with a mounting, positioning and hinging linkage constructed in accordance with one form of the present invention.

In the several figures of the drawing like characters of reference denote like parts and, referring particularly to Fig. 1, the numeral 10 designates the helicopter fuselage having a landing carriage designated generally by the numeral 11 and an upwardly projecting rotor driving mast 12. The numerals 13 and 14 denote the blades of a two-blade rotor which is supported by and connected for driving rotation with rotor mast 12 by means which are illustrated in greater detail in Figs. 2, 3 and 4.

Figure 2:
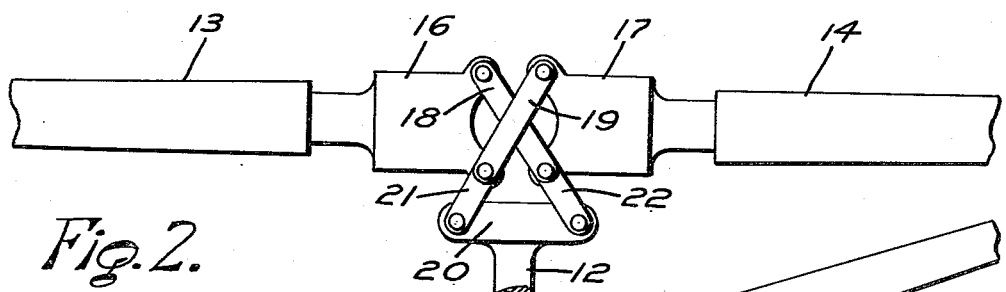
Fig. 2 is a view taken similarly to Fig. 1 but on an enlarged scale and showing only the root portions of the rotor blades and the supporting linkage which connects the blades to the rotor mast.

As shown in Fig. 2 the rotor blades 13 and 14 are provided with hub elements 16 and 17, respectively, these hub elements being provided with the usual means for effecting cyclic pitch change and other pitch change control movements of the blades. The hub elements 16 and 17 are interconnected by means of crossed links 18 and 19, the links 18 and 19 being equal and opposite, with link 18 connecting with the upper part of hub 16 and the lower part of hub 17 while link 19 connects with the lower part of hub 16 and the upper part of hub 17.

The upper end of rotor mast 12 has a mounting portion 20 and the two rotors with their crossed connecting links 18 and 19 are connected to mounting portion 20 of mast 12 by means of a pair of links 21 and 22. In the present instance the upper ends of the links 21 and 22 are pivoted to the rotor assembly on axes coincident with the lower pivotal connections of the links 18 and 19, but this arrangement is for convenience and simplicity only and is not essential to the present invention.

In fact, the operation of the rotors, insofar as the crossed link connection is concerned, may best be considered and analyzed separately from the connection which is established between the rotor assembly and the mounting mast by means of these links 21 and 22. The lower ends of links 21 and 22 are pivoted to mounting portion 20 of rotor mast 12, the centers of such connections in the present instance being spaced at a somewhat greater distance than the centers of the connections of the upper ends of the links 21 and 22 with the rotor assembly.

The manner in which the foregoing linkage provides a free flapping rotor system which may be considered as articulated in the vertical plane of the rotors will be discussed in greater detail hereinafter. It is to be understood that the blades are rigidly restrained in chordwise directions and accordingly the linkage described in conjunction with Fig. 2 will preferably be duplicated at the front and back of the roots of the rotor blades as viewed in Fig. 2.

In describing the operation we shall first refer to the manner in which the links 21 and 22 cooperate to automatically dispose the center of gravity of the rotor assembly on or substantially on a vertical line coincident with the center of the rotor mast 12. For this purpose we may ignore the crossed links 18 and 19 and as far as the present phase of the operation is concerned the rotors 13 and 14, or more properly their supporting hubs 16 and 17, might be connected by a simple central coning hinge.

Figure 3:
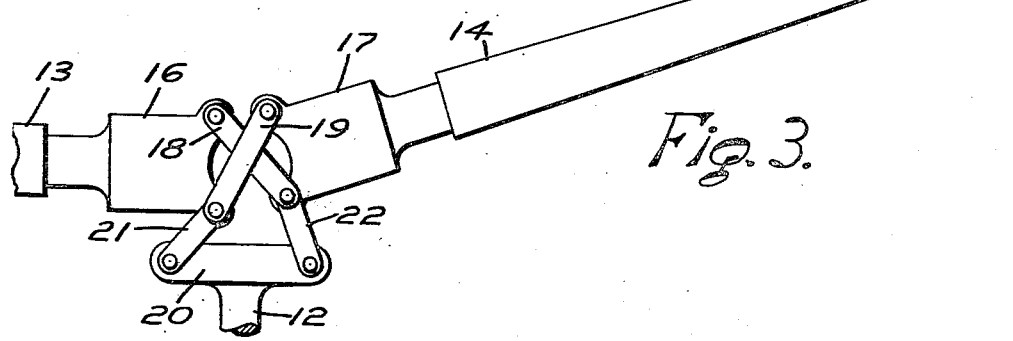
Fig. 3 is a view similar to Fig. 2 but with the right-hand rotor blade in a flapping position.

The manner in which the links 21 and 22 cooperate to redispose or reposition the center of gravity of the rotors and their mountings upon upward flapping of one of the rotor blades to a greater degree than the other rotor blade or to a position higher than that of the other rotor blade is clearly illustrated in Fig. 3. When a rotor blade flaps upwardly, as in the case of the right-hand rotor blade 14 in Fig. 3, the effective horizontal length of that blade is foreshortened and accordingly its center of gravity moves closer to the center of rotation, that is, closer to the vertical center line of mast 12.

This has the effect of moving the center of gravity of the combined blades 13 and 14 to the left of the center line of the mast, since the center of gravity of the left-hand blade 13 is not disturbed in this movement, if no correcting factors or measures are taken. This undesirable phenomenon is one condition that is eliminated or corrected for by reason of the mounting of the rotors through the links 21 and 22. For the purpose of understanding Fig. 3, it will be well to call attention to the fact that, in the crossed link construction illustrated in the present embodiment, the instantaneous geometric or pivotal center of the two blades relative to each other, (not their combined center of gravity) is the point at which the longitudinal center lines of the individual links 18 and 19 intersect.

With blade 14 flapped upwardly as shown in Fig. 3, the operation of positioning links 21 and 22 is such as to move this virtual geometric center of the two blades to the right of the vertical center line of mast 12 as viewed in Fig. 3. The various links are so proportioned that this displacement is just enough to dispose the combined center of gravity, which is now displaced to the left of the geometric center, sufficiently to the left of the geometric or effective pivotal center so that the center of gravity of the rotor assembly falls on the vertical center line of mast 12 or at least materially closer to such vertical line. This effectively eliminates or materially minimizes the geometric unbalance which would otherwise be caused by a flapping movement of the right-hand blade 14 to a greater upward extent than that of the left-hand blade 13 or, as in the present instance, an upward flapping of the right-hand blade 14 unaccompanied by any upward flapping of the left-hand blade 13 or accompanied by a dipping movement of the left-hand blade.

Attention will now be given particularly to Fig. 4 which illustrates the condition which prevails when both rotor blades have moved upwardly to approximately equal degrees in a coning movement or adjustment. In this phase of operation the positioning links 21 and 22 are symmetrically disposed and attention is here directed to the crossed links 18 and 19 which come into direct play as will now be described.

In the case of a simple single coning hinge a coning movement of the blades moves their combined center of gravity substantially upwardly of the coning hinge and thus centrifugal forces acting on the rotor blades produce very substantial moments tending to straighten the blades or move them downwardly to their horizontal positions. This is sometimes partially counteracted by disposing a simple coning hinge above the horizontal center line of the rotors when the rotors are in a horizontal position. However, this compromise merely reduces the very substantial tendency of the blades to move to horizontal position from a coning position under the influence of coning or flapping and the incident cetrifugal forces generated thereby.

Figure 4:
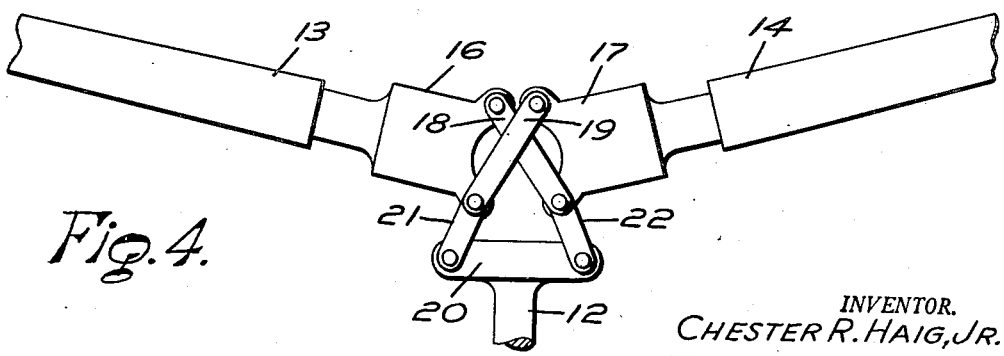
Fig. 4 is a view similar to Figs. 2 and 3 but with both of the rotor blades in a flapping or coning position.

It will be noted by comparing Figs. 2 and 4 that the shift of the rotor blades 13 and 14 from the horizontal positions of Fig. 2 to the substantially coned positions of Fig. 4 causes the crossed connecting links 18 and 19 to intersect in such a way that the point where the longitudinal center lines of the links 18 and 19 intersect is much higher, that is, much closer to the upper ends of the links 18 and 19, than in Fig. 2, where the links intersect substantially at the horizontal center lines of the rotor blades 13 and 14.

As has been previously stated, the virtual coning hinge or pivot point of the blades with the crossed link construction shown in the drawing is at the point where the links intersect. Therefore, with the construction shown, the crossed link connection 18 and 19 has served, in adjustment of the blades 13 and 14 from the position at Fig. 2 to the position of Fig. 4, to shift the effective hinging axis of the blades substantially upwardly. The result is that in Fig. 4 the effective coning hinge axis of the blades lies at or nearly at the same vertical level as the centers of gravity of the blades 13 and 14 when they are in the position shown in Fig. 4. This substantially eliminates or to a major extent minimizes the straightening tendency of the blades under centrifugal force when they are in a coned or flapped condition.

The operations have been described separately in the cases of Figs. 3 and 4 merely to facilitate basic understanding of the two corrective operations introduced by the positioning links 21 and 22 and the crossed links 28 and 19. Actually, the operation is more complex and is not as simple and separate as it has thus been described. In actual operation both conditions which the present mounting seeks to correct exist in varying degrees simultaneously, that is, excessive or substantial coning together with flapping or unequal upward movement of the blades. Under these varying conditions the positioning links 21 and 22 and the crossed links 18 and 19 cooperate jointly to provide a much more stable and geometrically balanced rotor system.

What is claimed is:

1. In a rotary wing aircraft including a fuselage, a rotary drive shaft projecting upwardly therefrom, a pair of opposed radiating rotor blades and hinge means connecting the inner ends of said blades for relative swinging movement in a vertical plane, and means connecting said blades to said drive shaft for relative pivotal movement on chordwise axes, said connecting means comprising positioning link means including a pair of links connected at their lower ends to said rotor drive shaft and at their upper ends to the root portions of said blades, the hinge means for said blades comprising a pair of intersecting links, one link being pivoted at its upper end to an upper part of the root portion of one blade and at its lower end to the lower part of the root portion of the other blade and the other link being pivoted at its lower end to a lower part of the root portion of said one blade and at its upper end to the upper part of the root portion of said other blade, whereby the effective chordwise hinging axis of the blades raises proportionately to upward hinging movement thereof.

2. In a rotary wing aircraft including a fuselage, a rotary drive shaft projecting upwardly therefrom, a pair of opposed radiating rotor blades and hinge means connecting the inner ends of said blades for relative swinging movement in a vertical plane, and means connecting said blades to said drive shaft for relative pivotal movement on chordwise axes, the hinge means for said blades comprising a pair of intersecting links, one link being pivoted at its upper end to an upper part of the root portion of one blade and at its lower end to the lower part of the root portion of the other blade and the other link being pivoted at its lower end to a lower part of the root portion of said one blade and at its upper end to the upper part of the root portion of said other blade, whereby the effective chordwise hinging axis of the blades raises proportionately to upward hinging movement thereof.

3. In a rotary wing aircraft including a fuselage, a rotary drive shaft projecting upwardly therefrom, a pair of opposed radiating rotor blades connected to said drive shaft, and hinge means connecting the inner ends of said blades for relative swinging movement in a vertical plane, the hinge means for said blades comprising a pair of intersecting links, one link being pivoted at its upper end to an upper part of the root portion of one blade and at its lower end to the lower part of the root portion of the other blade and the other link being pivoted at its lower end to a lower part of the root portion of said one blade and at its upper end to the upper part of the root portion of said other blade, whereby the effective chordwise hinging axis of the blades raises proportionately to upward hinging movement thereof.

4. In a rotary wing aircraft including a fuselage, a rotary drive shaft projecting upwardly therefrom, a pair of opposed radiating rotor blades and hinge means connecting the inner ends of said blades for relative swinging movement of said blades in a vertical plane, and means connecting each of said blades to said drive shaft, said connecting means comprising positioning link means including a pair of upwardly extending links connected at their lower ends to said rotor drive shaft and at their upper ends to the root portions of said blades whereby their pivot points form a quadrilateral linkage and whereby upon hinging movement of one blade upwardly beyond the other the blades move proportionately bodily laterally in the direction of said one blade under the control of said linkage.

5. In a rotary wing aircraft including a fuselage, a rotary drive shaft projecting upwardly therefrom, a pair of opposed radiating rotor blades and hinge means connecting the inner ends of said blades for relative swinging movement of said blades in a vertical plane, and means connecting each of said blades to said drive shaft, said connecting means comprising positioning link means including a pair of links connected at their lower ends to said rotor drive shaft and at their upper ends to the root portions of said blades.

6. In a rotary wing aircraft including a fuselage, a rotary drive shaft projecting upwardly therefrom, a pair of opposed radiating rotor blades and hinge means connecting the inner ends of said blades for relative swinging movement of said blades in a vertical plane, and means connecting each of said blades to said drive shaft, said connecting means comprising positioning linkage operable upon hinging movement of one blade upwardly beyond the other to move the blades proportionately bodily laterally in the direction of said one blade.

References Cited in the file of this patent

UNITED STATES PATENTS

| Number | Name | Date |
| --- | --- | --- |
| 594,761 | Shedd | Nov. 30, 1897 |
| 691,080 | Shedd | Jan. 14, 1902 |
| 2,440,293 | Stanley | April 27, 1948 |